E. L. HOPKINS.
BAND CUTTER AND FEEDER.
APPLICATION FILED NOV. 4, 1907.
922,902.
Patented May 25, 1909.
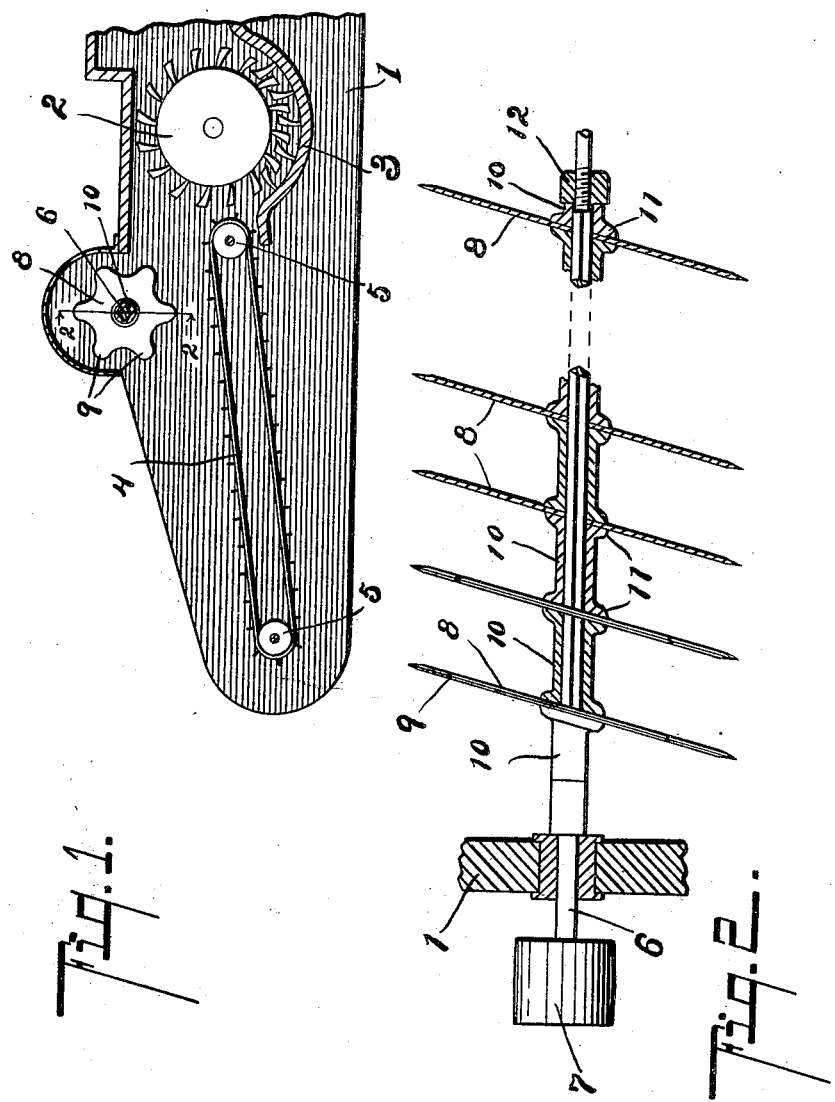

UNITED STATES PATENT OFFICE.

ESICK L. HOPKINS, OF ALBION, MICHIGAN, ASSIGNOR OF ONE-HALF TO ALBERT M. KNOWLES, OF HOMER, MICHIGAN.

BAND-CUTTER AND FEEDER.

No. 922,902.

Specification of Letters Patent.

Patented May 25, 1909.

Application filed November 4, 1907. Serial No. 400,532.

*To all whom it may concern:*

Be it known that I, ESICK L. HOPKINS, a citizen of the United States, residing at Albion, county of Calhoun and State of Michigan, have invented certain new and useful Improvements in Band-Cutters and Feeders, of which the following is a specification.

This invention relates to improvements in band cutters and feeders.

The main object of this invention is to provide an improved band cutter and feeder for threshing machines which effectively severs the bands and spreads the grain so that it is properly distributed and delivered to the cylinder.

A further object is to provide a structure adapted to accomplish these results which is simple and economical to produce and very durable, and one which is not likely to get out of repair in use.

Further objects, and objects relating to structural details, will definitely appear from the detailed description to follow.

I accomplish the objects of my invention by the devices and means described in the following specification.

The invention is clearly defined and pointed out in the claim.

A structure embodying the features of my invention is clearly illustrated in the accompanying drawing, forming a part of this specification, in which:

Figure 1 is a detail longitudinal, vertical section of a structure embodying the features of my invention, the parts being shown in conventional form and without particular regard to relative proportions thereof. Fig. 2 is an enlarged detail section taken on a line corresponding to line 2—2 of Fig. 1, looking in the direction of the little arrows at the ends of the section lines.

In the drawings, similar reference numerals refer to similar parts throughout the several views, and the sectional views are taken looking in the direction of the little arrows at the ends of the section lines.

Referring to the drawing, 1 represents the body of a threshing machine, the forward end only being illustrated. 2 represents the cylinder and 3 the concave, these parts being shown in conventional form.

A bundle conveyer 4 is provided, and this is also illustrated in conventional form, as the details thereof form no part of this invention. The bundle conveyer illustrated is carried by the rollers 5, driving connections of which are not illustrated. Above the delivery end of the conveyer is a shaft 6, the shaft being arranged substantially parallel with the cylinder 2. The belt pulley 7 of the shaft is connected to be driven with the other mechanism. On the shaft 6 I arrange a plurality of disk-like knives 8, each knife being preferably provided with a plurality of cutting projections 9. These projections are preferably sharpened on both edges so that the knives can be reversed when one side is dull, thereby bringing the other side into position. The shaft 6 is preferably squared and the knives are clamped thereon by means of sleeves 10. These sleeves 10 are preferably provided with flanges 11 at each end, and the ends of the sleeves are inclined to their axes so that the knives are clamped upon the shaft in substantially parallel relation to each other and an inclined relation to the axis of the shaft so that when the shaft revolves, the knives not only cut the bands but spread and loosen the straw with a shaking movement somewhat similar to hand feeding. The sleeves are clamped up by means of the nut 12, which is threaded upon the shaft. I thus secure, in a simple and effective manner, means for detachably clamping the knives to the shaft so they may be reversed to bring both cutting edges into position for use, or removed for grinding. The shaft 6 is arranged above the conveyer in such a position that the knives strike into the bundles carried forward by said conveyer, thereby severing the bands and as the knives revolve, the grain in the bundle is loosened and spread so it is properly delivered to the cylinder. The knives extend across the throat of the machine so that it is practically impossible for a bundle to reach the cylinder without the band being cut and the straw properly loosened and spread.

The mechanism of my improved band cutter and feeder is very simple and very durable in use and not likely to get out of repair. I have, as before remarked, shown the same largely in conventional form, as the details of the cylinder and conveyer form no part of this invention, the parts being illustrated merely to show its general combination and its relation in use.

Having thus described my invention, what I claim as new and desire to secure by Letters Patent is:

In a threshing machine, a band cutter and feeder comprising a shaft; a plurality of disk-like knives, each knife being provided with a plurality of cutting projections sharpened on both edges, said cutting projection having rounded sharpened ends; spacing sleeves for said knives arranged on said shaft, the ends of said spacing sleeves having flange-like enlargements thereon, the face of said enlargements being inclined to the axis of the sleeves; and a clamping nut threaded upon said shaft for clamping said sleeves upon said disk-like knives whereby they are detachably secured upon said shaft substantially parallel to each other and in an inclined position relative to the axis of the shaft.

In witness whereof, I have hereunto set my hand and seal in the presence of two witnesses.

ESICK L. HOPKINS. [L. S.]

Witnesses:
L. M. HENDERSON,
H. W. CAVANAGH.